US011047691B2

(12) United States Patent
Comer et al.

(10) Patent No.: US 11,047,691 B2
(45) Date of Patent: Jun. 29, 2021

(54) SIMULTANEOUS LOCALIZATION AND MAPPING (SLAM) COMPENSATION FOR GESTURE RECOGNITION IN VIRTUAL, AUGMENTED, AND MIXED REALITY (XR) APPLICATIONS

(71) Applicant: Dell Products, L.P., Round Rock, TX (US)

(72) Inventors: Ryan Nicholas Comer, Austin, TX (US); Vivek Viswanathan Iyer, Austin, TX (US); Anantha K. Boyapalle, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 302 days.

(21) Appl. No.: 16/177,081

(22) Filed: Oct. 31, 2018

(65) Prior Publication Data
US 2020/0132474 A1 Apr. 30, 2020

(51) Int. Cl.
*G01C 21/32* (2006.01)
*G06T 19/00* (2011.01)
(Continued)

(52) U.S. Cl.
CPC ........... *G01C 21/32* (2013.01); *G02B 27/017* (2013.01); *G06F 3/017* (2013.01); *G06F 16/29* (2019.01);
(Continued)

(58) Field of Classification Search
CPC ......... G01C 21/32; G06F 16/29; G06F 3/017; G02B 27/017; G06K 9/00355; G06T 19/006
(Continued)

(56) References Cited

U.S. PATENT DOCUMENTS

2012/0105473 A1\* 5/2012 Bar-Zeev ................. G06T 7/70
345/633
2014/0347391 A1\* 11/2014 Keane ................. G06F 3/04815
345/633
(Continued)

OTHER PUBLICATIONS

Microsoft, "Gestures," Mar. 20, 2018, 8 pages, retrieved Aug. 29, 2018, available at https://docs.microsoft.com/en-us/windows/mixed-reality/gestures.
(Continued)

*Primary Examiner* — Prabodh M Dharia
(74) *Attorney, Agent, or Firm* — Fogarty LLP

(57) ABSTRACT

Embodiments of systems and methods for Simultaneous Localization and Mapping (SLAM) compensation for gesture recognition in virtual, augmented, and mixed reality (xR) applications are described. In an illustrative, non-limiting embodiment, an Information Handling System (IHS) may include a processor and a memory coupled to the processor, the memory having program instructions stored thereon that, upon execution by the processor, cause the IHS to: receive a first set of images from a SLAM camera, wherein the first set of images captures movement of a Head-Mounted Device (HMD); calculate a transformation matrix based upon the first set of images; receive a second set of images from a gesture camera, wherein the second set of images captures a gesture; and apply the transformation matrix to the second set of images prior to recognizing the gesture.

19 Claims, 7 Drawing Sheets

(51) Int. Cl.
*G06F 3/01* (2006.01)
*G06K 9/00* (2006.01)
*G02B 27/01* (2006.01)
*G06F 16/29* (2019.01)

(52) U.S. Cl.
CPC ........ *G06K 9/00355* (2013.01); *G06T 19/006* (2013.01); *G02B 2027/0187* (2013.01)

(58) Field of Classification Search
USPC .................................................. 345/418, 633
See application file for complete search history.

(56) References Cited

U.S. PATENT DOCUMENTS

| | | | | |
|---|---|---|---|---|
| 2015/0154804 | A1* | 6/2015 | Wang | G06K 9/00315 345/633 |
| 2015/0193070 | A1* | 7/2015 | Tilak | G06F 3/041 345/173 |
| 2018/0107440 | A1* | 4/2018 | Knoppert | G09G 5/00 |
| 2018/0164593 | A1* | 6/2018 | Van Der Auwera | H04N 21/816 |
| 2018/0272231 | A1* | 9/2018 | Katoh | A63F 13/213 |
| 2018/0284882 | A1* | 10/2018 | Shipes | G02B 27/017 |
| 2019/0158549 | A1* | 5/2019 | Miller | H04L 65/4015 |
| 2019/0208181 | A1* | 7/2019 | Rowell | H04N 5/23267 |
| 2019/0213792 | A1* | 7/2019 | Jakubzak | G06F 3/017 |
| 2020/0019673 | A1* | 1/2020 | Peng | G06F 30/398 |

OTHER PUBLICATIONS

Virtual Reality Times, "List of Gesture Controllers for Virtual Reality," Feb. 16, 2017, 10 pages, retrieved Aug. 29, 2018, available at https://virtualrealitytimes.com/2017/02/16/vr-gesture-controllers/.

Nathan Ingraham, "Meta's new AR headset lets you treat virtual objects like real ones," Mar. 2, 2016, 9 pages, retrieved Aug. 29, 2018, available at https://www.engadget.com/2016/03/02/meta-2-augmented-reality-headset-hands-on/.

Leap Motion, Inc., "Leap Motion Gesture Recognition" 11 pages, retrieved Aug. 29, 2018, available at http://blog.leapmotion.com//?s=Leap+Motion+Gesture+Recognition&submit=Search.

Riisgaard et al., "SLAM for Dummies", retrieved Aug. 29, 2018, 127 pages, Extended KalmanFilters for SLAM, available at https://ocw.mit.edu/courses/aeronautics-and-astronautics/16-412j-cognitive-robotics-spring-2005/projects/1aslam_blas_repo.pdf.

Occipital, "Structured Core," 6 pages, retrieved Aug. 29, 2018, available at https://structure.io/core.

* cited by examiner

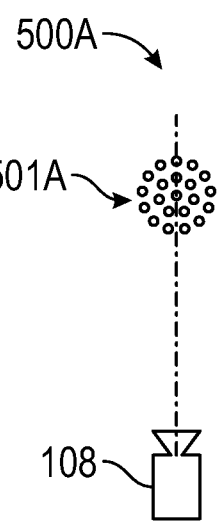
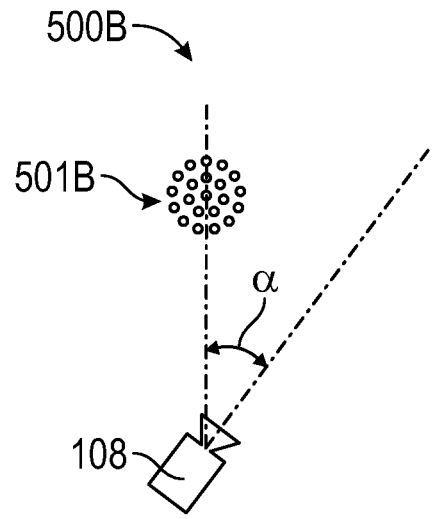
FIG. 5A    FIG. 5B
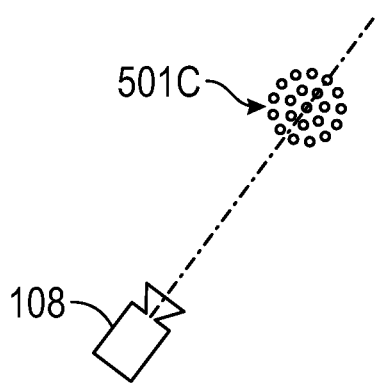
FIG. 5C

SIMULTANEOUS LOCALIZATION AND MAPPING (SLAM) COMPENSATION FOR GESTURE RECOGNITION IN VIRTUAL, AUGMENTED, AND MIXED REALITY (XR) APPLICATIONS

FIELD

The present disclosure generally relates to Information Handling Systems (IHSs), and, more particularly, to Simultaneous Localization and Mapping (SLAM) compensation for gesture recognition in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for Simultaneous Localization and Mapping (SLAM) compensation for gesture recognition in virtual, augmented, and mixed reality (xR) applications are described. In an illustrative, non-limiting embodiment, an Information Handling System (IHS) may include a processor and a memory coupled to the processor, the memory having program instructions stored thereon that, upon execution by the processor, cause the IHS to: receive a first set of images from a SLAM camera, wherein the first set of images captures movement of a Head-Mounted Device (HMD); calculate a transformation matrix based upon the first set of images; receive a second set of images from a gesture camera, wherein the second set of images captures a gesture; and apply the transformation matrix to the second set of images prior to recognizing the gesture.

In some implementations, the SLAM camera may include an infra-red (IR) camera, and the gesture camera may include a visible spectrum camera. The first and second sets of images may be received concurrently. The transformation matrix may include at least one of: a translation matrix, a rotation matrix, or a scaling matrix. To apply the transformation matrix, the program instructions, upon execution by the processor, further cause the IHS to: convert the second set of images from a gesturing coordinate system into a global coordinate system; multiply the one or more images of the second set of images by the transformation matrix to produce SLAM-compensated images; and convert the SLAM-compensated images from the global coordinate system into the gesturing coordinate system.

To produce the SLAM-compensated images, the program instructions, upon execution by the processor, further cause the IHS to subtract an HMD velocity from a gesture velocity. The SLAM camera and the gesture camera may be offset by a physical distance. The program instructions, upon execution by the processor, may cause the IHS to apply an offset matrix to the second set of images prior to recognizing the gesture, were the offset matrix corresponds to the physical distance.

In some cases, the program instructions, upon execution by the processor, may cause the IHS to: detect, based upon the first set of images, movement of the HMD above a threshold value; and in response to the detection, reduce a number of candidate gestures. The movement may be detected as a rotation to the right, and the program instructions, upon execution by the processor, may cause the IHS to eliminate a right swiping gesture from the candidate gestures. Additionally, or alternatively, the movement may be detected as a rotation to the right, and the program instructions, upon execution by the processor, may cause the IHS to eliminate a left swiping gesture from the candidate gestures.

Additionally, or alternatively, the movement may be detected as a to the left, and the program instructions, upon execution by the processor, may cause the IHS to eliminate a right swiping gesture from the candidate gestures. Additionally, or alternatively, the movement may be detected as a rotation to the left, and the program instructions, upon execution by the processor, may cause the IHS to eliminate a left swiping gesture from the candidate gestures.

Additionally, or alternatively, the movement may be detected as a rotation upward, and the program instructions, upon execution by the processor, may cause the IHS to eliminate an upward swiping gesture from the candidate gestures. Additionally, or alternatively, the movement may be detected as a rotation upward, and the program instructions, upon execution by the processor, may cause the IHS to eliminate a downward swiping gesture from the candidate gestures.

Additionally, or alternatively, the movement may be detected as a rotation downward, and the program instructions, upon execution by the processor, further cause the IHS to eliminate an upward swiping gesture from the candidate gestures. Additionally, or alternatively, the movement may be detected as a rotation downward, and the program instructions, upon execution by the processor, may cause the IHS to eliminate a downward swiping gesture from the candidate gestures.

Additionally, or alternatively, the movement may be detected as a translation, and wherein the program instructions, upon execution by the processor, further cause the IHS to eliminate a forward or backward swiping gesture from the candidate gestures.

In another illustrative, non-limiting embodiment a method may include receiving frames from at least one camera mounted on an HMD during execution of an xR application; tracking HMD movement using the frames; and compensating a gesture performed by the HMD movement. In yet another illustrative, non-limiting embodiment, a hardware memory of an HMD may have program instructions stored thereon that, upon execution by a processor, cause the HMD to: detect HMD movement during execution of an xR application; and modify an ultrasonic gesture recognition process in response to the detection.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIGS. 5A-C are diagram illustrating Simultaneous Localization and Mapping (SLAM) compensation for gesture recognition, according to some embodiments.

DETAILED DESCRIPTION

To facilitate explanation of the various systems and methods discussed herein, the following description has been split into sections. It should be noted, however, that any sections, headings, and subheadings used herein are for organizational purposes only, and are not meant to limit or otherwise modify the scope of the description nor the claims.

Overview

Embodiments described herein provide systems and methods for Simultaneous Localization and Mapping (SLAM) compensation for gesture recognition in virtual, augmented, and mixed reality (xR) applications. These techniques are particularly useful in xR applications that employ Head-Mounted Devices (HMDs), Heads-Up Displays (HUDs), and eyeglasses—collectively referred to as "HMDs."

Figure 1:
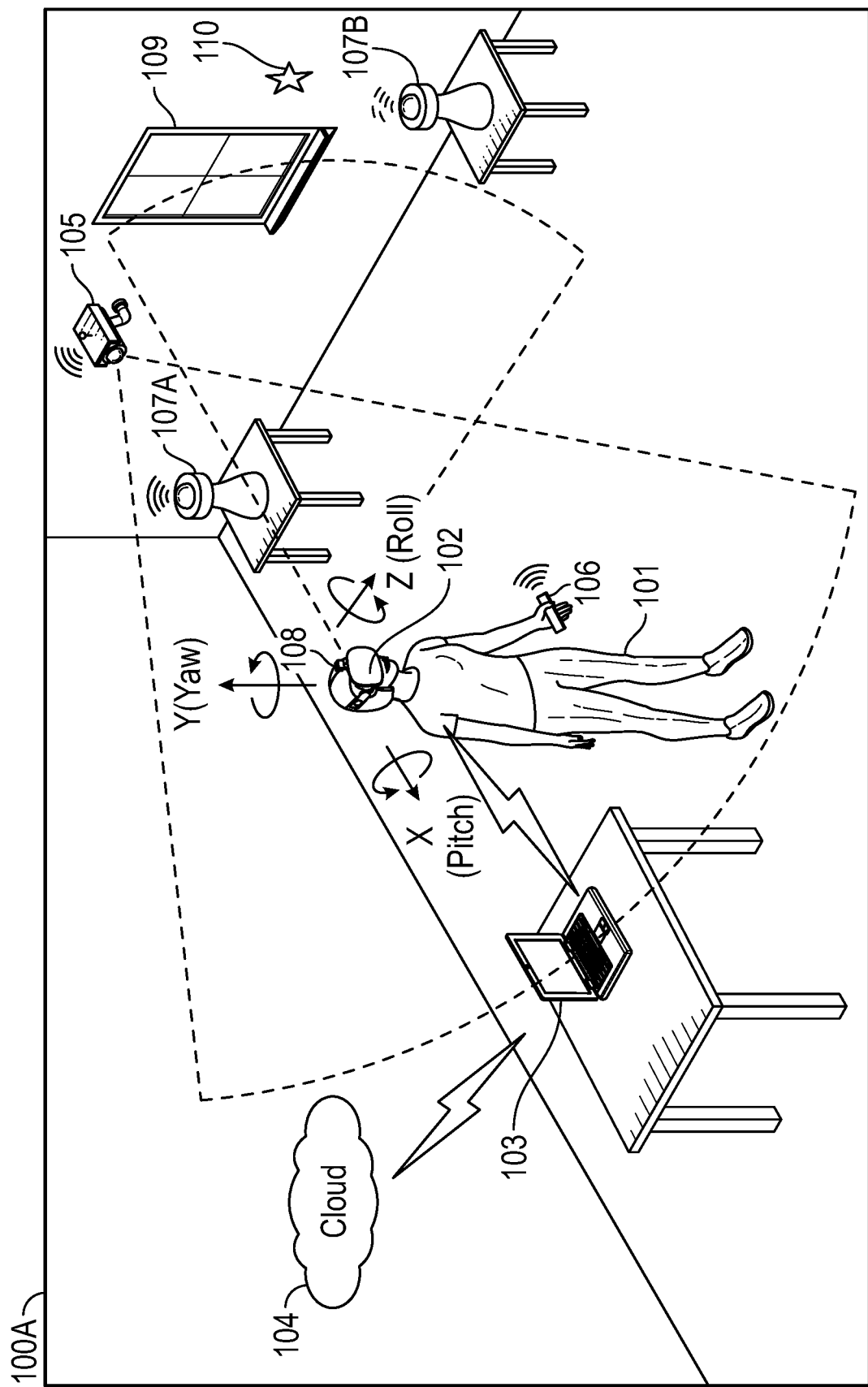
FIG. 1 illustrates an example of an environment where a virtual, augmented, or mixed reality (xR) application may be executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

Figure 2:
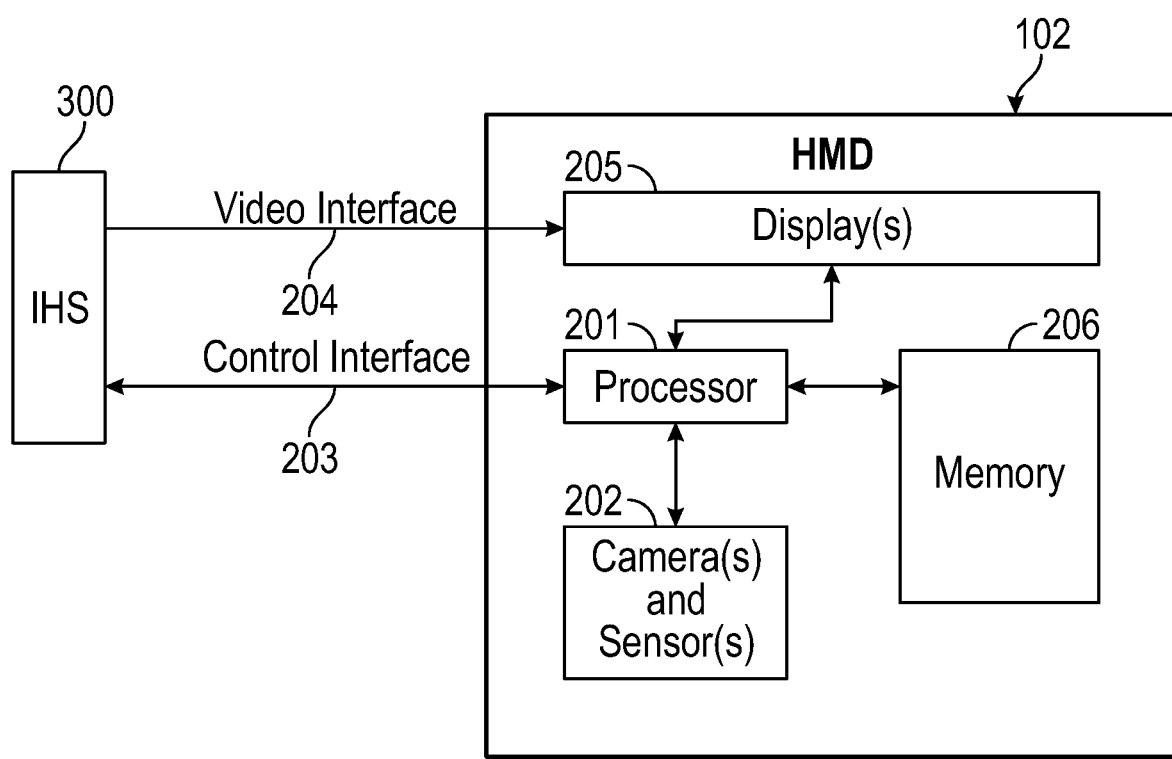
FIG. 2 illustrates an example of electronic components of a Head-Mounted Display (HMD), according to some embodiments.

FIG. 2 illustrates an example of electronic components of HMD 102. In various embodiments, HMD 102 may include number of camera(s) and/or sensor(s) 202 coupled to processor or controller 201, according to some embodiments. Examples of camera(s) 202 include, but are not limited to: inside-out cameras, outside-in cameras, eye tracking cameras, RGB cameras, gesture cameras, infrared (IR) or near-IR (NIR) cameras, SLAM cameras, etc. Meanwhile, examples of sensor(s) 202 include, but are not limited to: electric, magnetic, radio, optical, infrared, thermal, force, pressure, acoustic, ultrasonic, proximity, position, deformation, movement, velocity, rotation, gyroscopic, and/or acceleration sensor(s). In some cases, camera(s) and/or sensor(s) 202 may be coupled to processor or controller 201 via a sensor hub.

Processor or controller 201 of HMD 102 is also coupled to IHS 300 (FIG. 3) via a wired (e.g., USB) or wireless connection (e.g., Wi-Fi, Bluetooth, etc.), thus establishing control interface 203. Control interface 203 may provide a communication channel between processor 201 and IHS 300 to facilitate execution of an xR application. For example, program instructions stored in memory 206, when executed by processor 201, may cause frames captured by camera(s) 202 to be transmitted to IHS 300 via control interface 203.

IHS 300 may in turn execute SLAM module 403 (FIG. 4), for example, based upon landmarks found in the video frames received from HMD 102's camera(s) 108 (or from outside-in camera 105). Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to display(s) 205 via video interface 204 (e.g., HDMI, DVI, DISPLAY-PORT, etc.).

Video interface 204 may drive both a right and left display 205 (one for each eye), in order to provide a 3-D or stereoscopic view. In some cases, video interface 204 may include two separate video interfaces, one for each display 205. Additionally, or alternatively, a single interface that supports multi-stream may be used to drive both displays 205.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
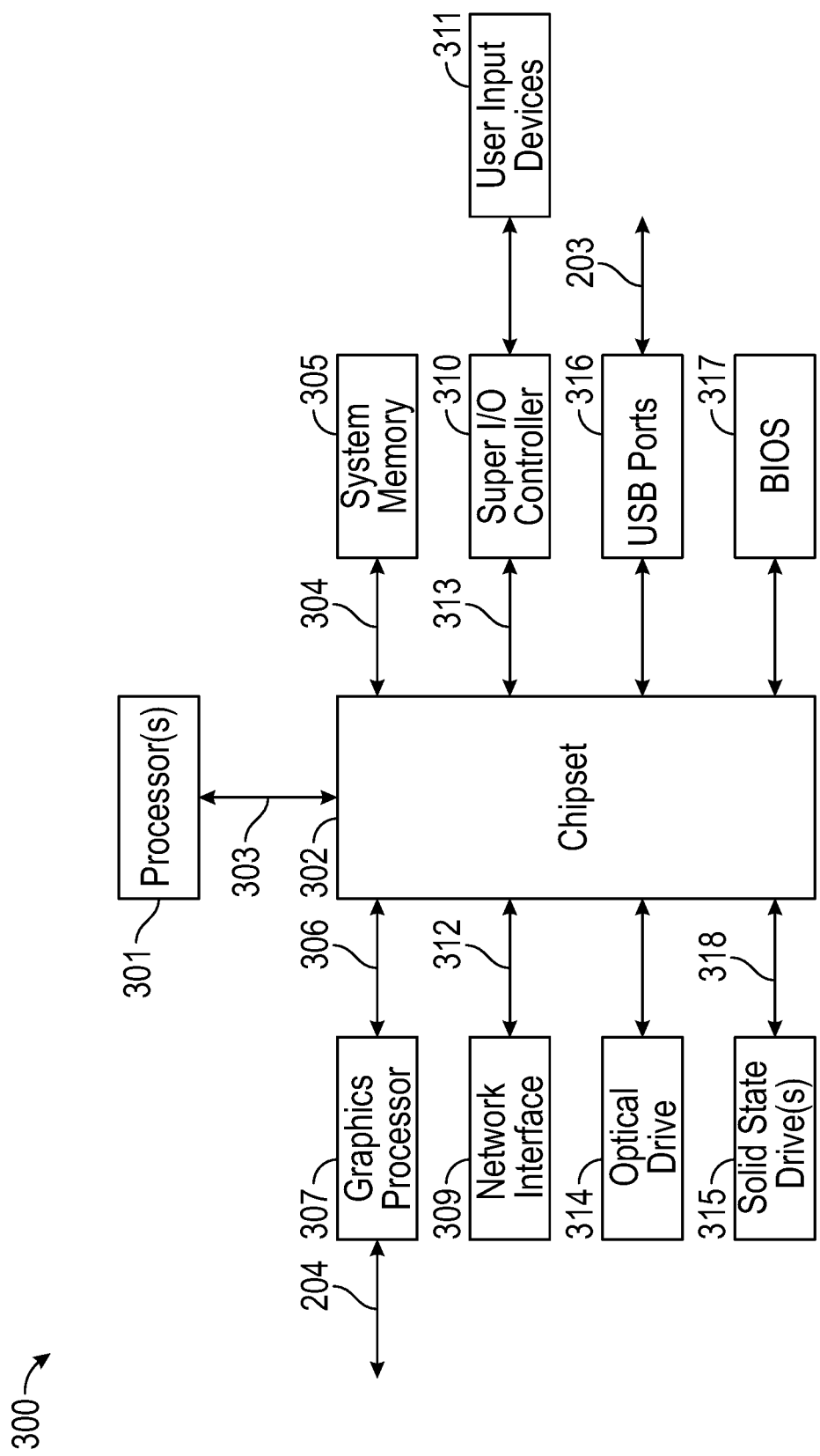
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of the IHS 300. Graphics processor 307 may be coupled to the chipset 302 via a graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 204 (e.g., HDMI, DVI, DISPLAYPORT, etc.).

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of the IHS 300 through the chipset 302. In certain embodiments, chipset 302 may be coupled to a network interface 309, such as provided by a Network Interface Controller (NIC) that is coupled to the IHS 300. In certain embodiments, the network interface 309 may be coupled to the chipset 302 via a PCIe bus 312. According to various embodiments, network interface 309 may support communication via various wired and/or wireless networks. In certain embodiments, the chipset 302 may also provide access to one or more Universal Serial Bus (USB) ports 316; which in some implementations may serve as transport for establishing control interface 203 with HMD 102.

Chipset 302 also provides access to one or more solid-state storage devices 315. The chipset 302 utilizes a PCIe bus interface connection 318 in order to communication with the solid-state storage device 315. In certain embodiments, chipset 302 may also provide access to other types of storage devices. For instance, in addition to the solid-state storage device 315, an IHS 300 may also utilize one or more magnetic disk storage devices, or other types of the storage devices such as an optical drive or a removable-media drive. In various embodiments, the solid-state storage device 315 may be integral to the IHS 300, or may be located remotely from the IHS 300.

Another resource that may be accessed by processor(s) 301 via chipset 302 is a Basic Input/Output System (BIOS) 317. As described in more detail below with respect to additional embodiments, upon powering or restarting IHS 300, processor(s) 301 may utilize BIOS 317 instructions to initialize and test hardware components coupled to the IHS 300 and to load an operating system for use by the IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to the IHS 300. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
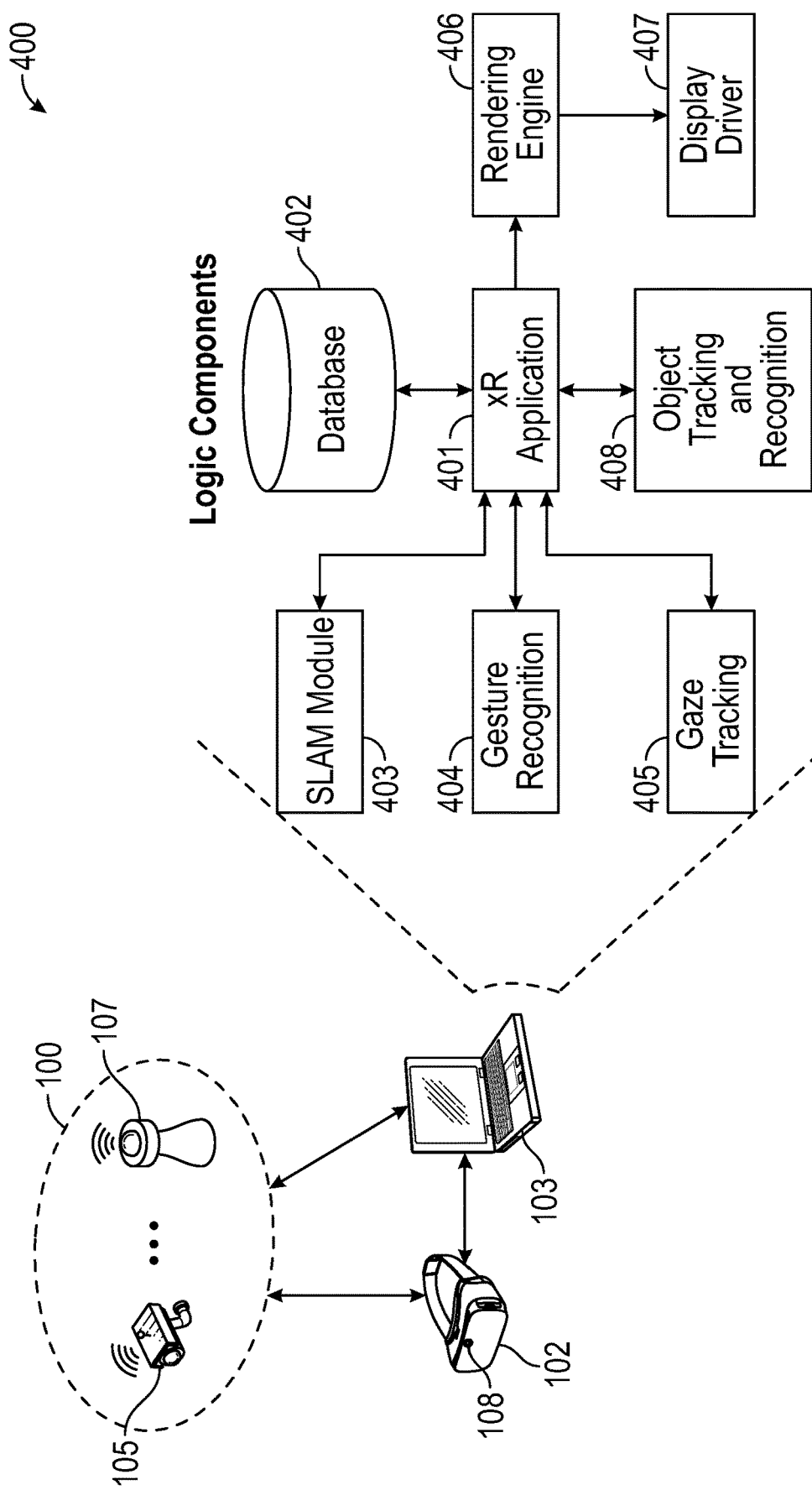
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, healthcare, education and training, military uses, occupational safety, engineering, industrial or product design, collaboration applications, virtual meetings, etc.

SLAM module 403 uses positional tracking devices among camera(s) and sensor(s) 202 (e.g., in the IR spectrum) to construct a map of an unknown environment where an HMD is located, which simultaneously identifies where the HMD is located, its orientation, and/or pose.

Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100 and/or one or more totems 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible (RGB), IR, or NIR range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

Gesture recognition module 404 may also use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Generally, gesture detection begins when video frame data (e.g., a video or depth-video stream) is received at host IHS 103 from gesture or RGB camera 108 of HMD 102. In some implementations, video data may have already been processed, to some degree, by processor 201 of HMD 102. Then, the video data is further processed to control aspects of xR application 401, by identifying various gestures and sequences that constitute user input.

At least a portion of the user's body may be identified in the video frame data obtained using gesture or RGB camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

Examples of one and two-handed gestures that may be recognized or tracked by gesture recognition module 404 include, but are not limited to: gestures for selecting and deselecting VOs, gestures for manipulating selected VOs (e.g., rotation and/or translation following the user's hand direction, position, and/or location), gestures for performing menu operations such as opening, closing, and/or repositioning (again, with menu rotation and/or translation following the user's hand), and gestures for manipulating applications, windows, or workspaces (e.g., using downward or upward swiping hand motion), among many others.

As used, herein, the term "minimize" or "minimizing" refers to the act of removing a window, object, application, or workspace from a main display area, collapsing it into an icon, caption, or placeholder. Conversely, the term "maximize" or "maximizing" refers to the act of displaying or expanding a window, object, application, or workspace to fill a main display area, for example, in response to user's selection of a corresponding icon, caption, or placeholder.

In other embodiments, the use of a virtual skeleton may not be necessary. For example, in other implementations, raw point-cloud data may be sent directly to a feature extraction routine within a gesture recognition module.

Additionally, or alternatively, a gesture recognition subsystem may include one or more ultrasonic sensors mounted on HMD 102 and configured to enable Doppler shift estimations of a reflected acoustic signal's spectral components.

For example, gesture recognition module 404 may compose an ultrasonic signal (e.g., with three selected frequencies), and it may transmit the signal using one or more ultrasonic transducers on HMD 102. Gesture recognition module 404 buffers a received audio pattern, de-noises it, and filters by the three selected frequencies across sliding windows of N seconds to perform Doppler shift estimations of the measured signal spectral components. Then, gesture recognition module 404 performs pattern matching operations against other stored patterns. If the received pattern is recognized, the gesture sequence is identified.

In various implementations, ultrasonic gesture recognition and/or tracking may be performed for gesture sequences that take place at least partially outside the field-of-view of a gesture camera, for example, near the side of the user's head. As such, visual gesture recognition and ultrasonic gesture recognition may be combined to provide a wider range of gesturing options to the user.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use MR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model displayed by HMD 102 from user 101's unique point-of-view based upon the user's coordinate location (e.g., from SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's' eyes.

Object tracking and recognition module 408 may implement any object identification or detection technique based on visual images, including, but not limited to: edge detection, corner detection, blob detection, ridge detection, or the like. In some cases, object tracking and recognition module 408 may operate with SLAM module 403 to track the position or movement of objects using landmarks or the like.

Database 402 may include if/then rules with real-world objects and their location, orientation, and/or movement (e.g., angle(s), direction(s), trajector(ies), speed(s), etc.). In some cases, an if/then rule catalog may be filtered based upon the presence or identification of a master object and/or other surrounding, secondary objects in the user's FOV. Database 402 may include different if/then rule catalogs based upon the identity of an authenticated user, for example, as part of a profile. Additionally, or alternatively, if/then rules may be based upon historic continuous usage.

In some cases, database 402 may also include a list of gesture candidates that can be recognized or tracked by GRT module 404. Each gesture candidate may include a set of parameters that, once identified in a given set of image frames, enable recognition of a presently performed gesture.

SLAM Compensation for Gesture Recognition

Gesture recognition is starting to gain prominence in xR environments. With the increased use of gesture sequences as a UI modality, the inventors hereof have recognized a need to support Gesture Sequence Recognition and Tracking (GRT) with configurable accuracy, resource usage, and complexity of operation, dynamically and/or in real-time.

In some implementations, GRT subsystems may employ a visible spectrum RGB camera. In other cases, GRT subsystems may use IR or Near-IR (NIR) cameras for improved accuracy, lower latency, and overall better fidelity. Separate GRT and SLAM cameras can be mounted on HMD 102, or can be integrated into a single set of front-end camera(s). Software subsystems (SLAM 403 and GRT 404) executed host IHS 103 may be operate with each other using Application Programming Interface (API) commands or the like.

However, GRT subsystems do not have a global coordinate reference system with which to reference hand movements leading to UI actions, in an agnostic manner. And, if HMD movement is not accounted for by the GRT subsystem, it can lead to "false alarms"—that is, the recognition of a gesture where the gesture was not performed or intended. For example, keeping a hand steady in front of HMD 102 and moving the head to the left can cause a false alarm of gesture recognition by the GRT subsystem, where the GRT subsystem mistakes the otherwise steady hand as having moved to the right, and therefore it inadvertently recognizes the HMD's rotation a hand "swipe" to the right (as a gesture command or a portion thereof).

FIGS. 5A-C are diagrams illustrating SLAM compensation for gesture recognition. In initial configuration 500A of FIG. 5A, gesture camera 108 is facing the real-world outside of HMD 102, and therefore captures frame 501A. In configuration 500B of FIG. 5B, gesture camera 108 is at an angle (a) from, and/or has an angular speed/acceleration with respect to the real-world, in this case due to the user's head rotation (clockwise), and therefore frame 501B is captured that is offset to the right, such that it appears that frame 501B has been shifted to the left of HMD 102. Then, in configuration 500C of FIG. 5C, frame 501C is compensated by HMD movement such that the HMD's movement is effectively removed from the gesture (e.g., angle, angular speed, and/or angular acceleration a is subtracted from frame 501B).

To implement the SLAM compensation of FIG. 5C, systems and methods described herein may continuously compensate GRT camera frames 501A using a camera transformation matrix (and/or a fixed GRT-SLAM camera offset matrix) that is obtained from SLAM module 403 during state 500B. These systems and methods may then feed SLAM-compensated GRT camera frames 501C into GRT module 404.

For example, a method may use data from the SLAM module 403 to transform raw sensor input from GRT module 404 to take head motion into account; which removes false positives in gesture recognition caused by head movement. For each image or frame, SLAM module 403 may produce a camera transform matrix that describes how the user moved during the frame.

For example, if the user looks to the right (and HMD 102 turns right), the camera transform matrix may include a rotation to the right. If the user looks to the left (and HMD 102 turns left), the camera transform matrix may include a rotation to the left. If the user looks up (and HMD 102 turns upward), the camera transform matrix may include a rotation upward. And if the user looks down (and HMD 102 turns downward), the camera transform matrix may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix also reflects the resulting translation. GRT module 404 may also collect raw sensor data that describes the user's hands for that frame.

The method may convert raw sensor input from GRT module 404 into "world space" for the xR application (a global coordinate system that the camera transform matrix uses) using a function F. The method may then apply the camera transform matrix to the converted sensor data. This may be done, for example, by multiplying the sensor data by the camera transform matrix. The output of this operation is GRT sensor data that has taken the HMD's movement into account. The data is then transformed back into its original form (e.g., in the gesturing subsystem's coordinate system) by applying the inverse of function F, and feeding it into the GRT module 404.

In embodiments where the SLAM camera and the gesture camera may be distinct from each other and mounted on HMD 102 offset by a physical distance, a method may include a calibration procedure to determine a fixed GRT-SLAM camera offset, and to calculate an offset matrix that corresponds to the physical distance. Such calibration may be done and set at factory for certain HMDs, or may be performed by user as part of a configuration menu.

In another embodiment, in steady-state, the camera transformation matrix and/or the fixed GRT-SLAM offset matrix may be used to compensate for gesture recognition, and the compensated frames may be fed into GRT module 404. As such, these systems and methods require no significant software changes to GRT or SLAM (other than tapping into SLAM output and feeding compensated input frames into GRT), and no hardware modifications. In some cases, these systems and methods may be computationally scaled by operating on spatially down-sampled GRT camera frames and/or lower frame rates (compute only at every n frame).

As such, systems and methods described herein may receive frames, track HMD movement using the frames; and compensate a gesture performed in the frames by the HMD movement. Additionally, or alternatively, systems and methods described herein may detect movement; and modify a gesture recognition process in response to the detection.

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (a). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

The term "world space," for xR application 401, refers to a coordinate system that defines where everything is located inside the application. Every object handled by xR application 401 may be given an X, Y and Z coordinate relative to an origin. Once calibrated, HMD sensors can transform their sensor data into world space coordinates. Then, when transform matrices are applied to 3D objects, the objects are moved around in world space. For instance, world space coordinates may be used by xR application 401 to overlay virtual hands directly on-top of the user's real hands.

The term "hand tracking" refers to the ability to determine the position of the user's hands and convert their position to world space, which can then be used to physically interact with VOs. Conversely, the term "gesture recognition" refers the ability to recognize a static pose or a certain movement of a user's hands for triggering an event. For example, the user might swipe right or left to move to the next or previous page in a virtual book, or may swipe up and down to minimize or maximize applications, windows, or workspaces.

Figure 6:
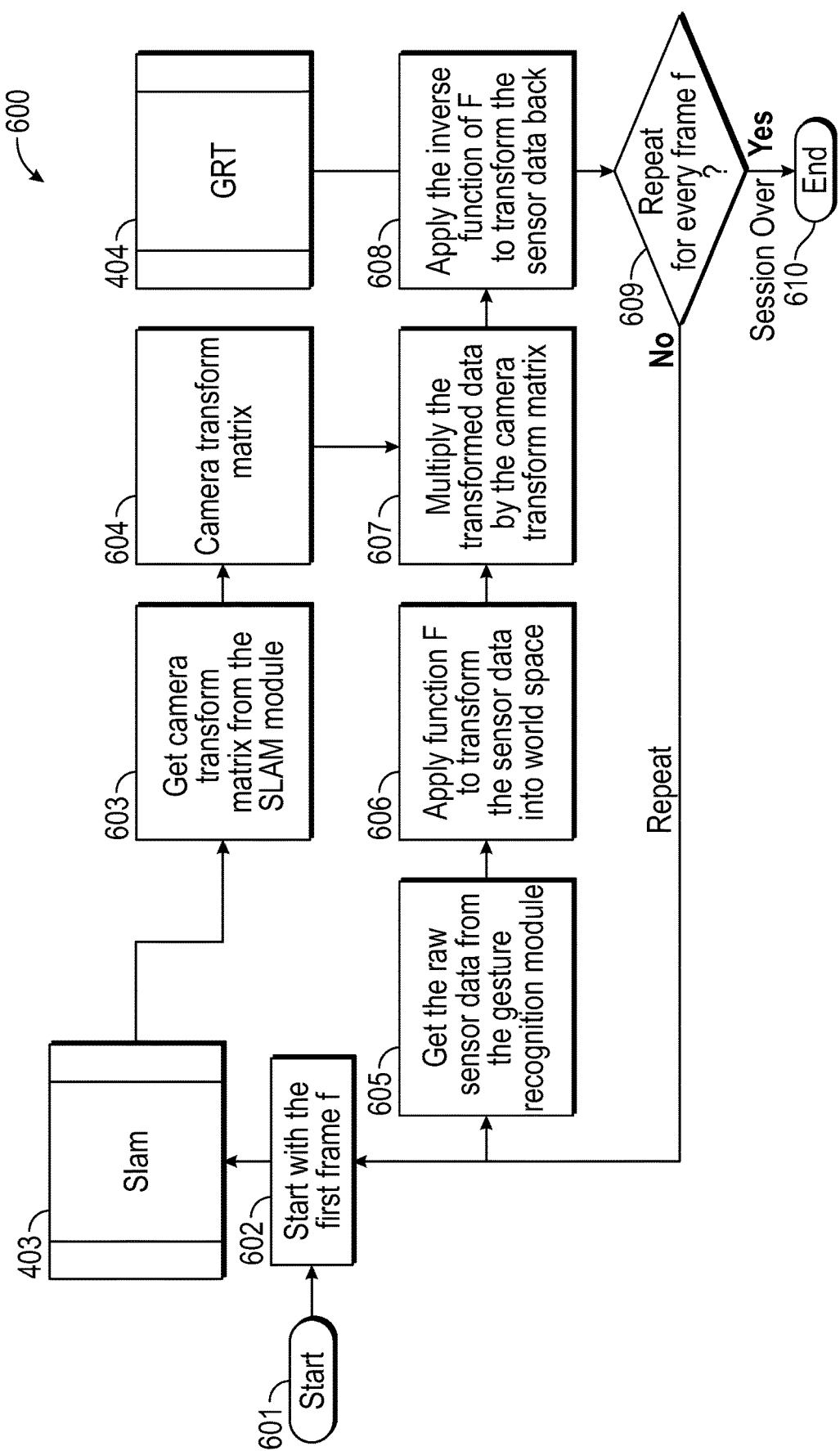
FIG. 6 is a flowchart of an example of a method for SLAM compensation for gesture recognition using a single camera, according to some embodiments.

FIG. 6 is a flowchart of method 600 for SLAM compensation for gesture recognition using a single camera. In various embodiments, method 600 may be performed, at least in part, by xR application 401. Particularly, method 600 starts at block 601. At block 602, method 600 selects a current IR frame f captured by SLAM/gesture camera 108. At block 603, method 600 calculates a camera transform matrix 604, via SLAM module 403, using methods available to a person of ordinary skill in the art.

Meanwhile, at block 605, method 600 obtains raw sensor data (e.g., IR frames). Block 606 applies a function F to transform the raw sensor data into world space coordinates. At block 607, method 600 multiplies the converted raw data by the camera transform matrix 604. Then, block 608 applies the inverse of function F to the output of block 607 (to return the transformed data to the gesturing system's coordinate system), thus providing GRT module 404 with SLAM-compensated frames.

Block 609 causes method 600 to be repeated for every frame f. Alternatively, method 600 may be repeated every n frames, and/or performed upon down-sampled GRT frames. Then, method 600 ends at block 610 when the xR session is over.

Figure 7:
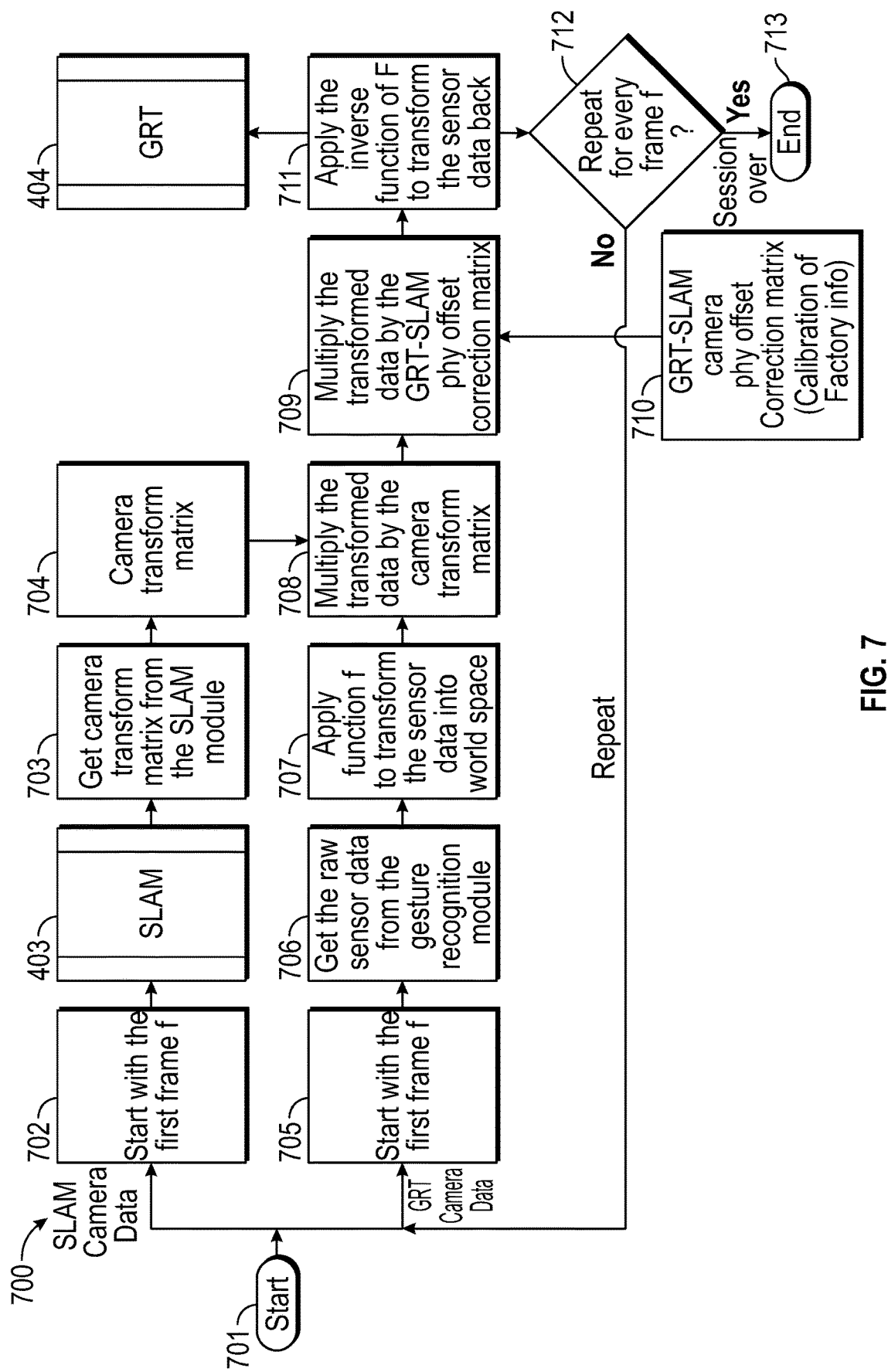
FIG. 7 is a flowchart of an example of a method for SLAM compensation for gesture recognition using separate cameras, according to some embodiments.

FIG. 7 is a flowchart of an example of method 700 for SLAM compensation for gesture recognition using separate cameras. In various embodiments, method 700 may be performed, at least in part, by xR application 401. Particularly, method 700 starts at block 701. At block 702, method 700 selects a current frame f captured by SLAM camera (e.g., an instance of camera 108 that operates in the IR spectrum). At block 703, method 700 calculates a camera transform matrix 704, via SLAM module 403, using methods available to a person of ordinary skill in the art.

At block 705, method 700 selects a current frame f captured by a separate gesture camera (e.g., another instance of camera 108), and block 706 captures RGB frames from GRT module 404, for example. Block 707 applies a function F to transform the gesture sensor data into world space coordinates. At block 708, method 600 multiplies the converted raw data by the camera transform matrix 704.

Because the SLAM and gesture cameras are mounted on HMD 102 with a physical distance between them, block 709 also multiplies the transformed data from block 708 by a GRT-SLAM physical offset correction matrix 710, which may be obtained during calibration and/or manufacturing. Then, block 711 applies the inverse of function F to the output of block 709 (to return the transformed data to the gesturing system's coordinate system), thus providing GRT module 404 with SLAM-compensated frames.

Block 712 causes method 700 to be repeated for every frame f. Alternatively, method 700 may be repeated every n frames, and/or performed upon down-sampled GRT frames. Then, method 700 ends at block 710 when the xR session is over.

In various implementations, during execution of methods 600 or 700, GRT module 404 may recognize a gesture performed in the SLAM-compensated frames. In some cases, in response to movement of the HMD being above a threshold value (e.g., a maximum rotation angle, speed, or acceleration), GRT module 404 may reduce a number of candidate gestures for recognition.

For example, if the movement is detected as a rotation to the right and/or to the left, GRT module 404 may eliminate a right and/or left swiping gesture from the list candidate gestures in database 402. Additionally, or alternatively, if the movement is detected as a rotation upward and/or downward, GRT module 404 may eliminate an upward and/or downward swiping gesture from the candidate gestures. Additionally, or alternatively, if the movement is detected as a translation, GRT module 404 may eliminate a forward and/or backward swiping gesture from the candidate gestures.

Although the methods of FIGS. 5 and 6 apply to visual gesture recognition subsystems, it should be noted that the same principles may be implemented with an ultrasonic gesturing subsystem. In those cases, at blocks, 607 and 708, the camera transform matrix obtained with the SLAM subsystem may be used to compensate the ultrasonic patterns or data received, as a function of HMD 102's rotation and/or translation.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
receive a first set of images from a Simultaneous Localization and Mapping (SLAM) camera, wherein the first set of images captures movement of a Head-Mounted Device (HMD);
detect, based upon the first set of images, movement of the HMD above a threshold value;
in response to the detection, reduce a number of candidate gestures;
calculate a transformation matrix based upon the first set of images;
receive a second set of images from a gesture camera, wherein the second set of images captures a gesture; and
apply the transformation matrix to the second set of images prior to recognizing the gesture.

2. The IHS of claim 1, wherein the SLAM camera comprises an infra-red (IR) camera, and wherein the gesture camera comprises a visible spectrum camera.

3. The IHS of claim 1, wherein the first and second sets of images are received concurrently.

4. The IHS of claim 1, wherein the transformation matrix comprises at least one of: a translation matrix, a rotation matrix, or a scaling matrix.

5. The IHS of claim 1, wherein to apply the transformation matrix, the program instructions, upon execution by the processor, further cause the IHS to:
convert the second set of images from a gesturing coordinate system into a global coordinate system;
multiply the one or more images of the second set of images by the transformation matrix to produce SLAM-compensated images; and
convert the SLAM-compensated images from the global coordinate system into the gesturing coordinate system.

6. The IHS of claim 5, wherein to produce the SLAM-compensated images, the program instructions, upon execution by the processor, further cause the IHS to subtract an HMD velocity from a gesture velocity.

7. The IHS of claim 1, wherein the SLAM camera and the gesture camera are offset by a physical distance.

8. The IHS of claim 7, wherein the program instructions, upon execution by the processor, further cause the IHS to apply an offset matrix to the second set of images prior to recognizing the gesture, wherein the offset matrix corresponds to the physical distance.

9. The IHS of claim 1, wherein the movement is detected as a rotation to the right, and wherein the program instructions, upon execution by the processor, further cause the IHS to eliminate a right swiping gesture from the candidate gestures.

10. The IHS of claim 1, wherein the movement is detected as a rotation to the right, and wherein the program instructions, upon execution by the processor, further cause the IHS to eliminate a left swiping gesture from the candidate gestures.

11. The IHS of claim 1, wherein the movement is detected as a rotation to the left, and wherein the program instructions, upon execution by the processor, further cause the IHS to eliminate a right swiping gesture from the candidate gestures.

12. The IHS of claim 1, wherein the movement is detected as a rotation to the left, and wherein the program instructions, upon execution by the processor, further cause the IHS to eliminate a left swiping gesture from the candidate gestures.

13. The IHS of claim 1, wherein the movement is detected as a rotation upward, and wherein the program instructions, upon execution by the processor, further cause the IHS to eliminate an upward swiping gesture from the candidate gestures.

14. The IHS of claim 1, wherein the movement is detected as a rotation upward, and wherein the program instructions, upon execution by the processor, further cause the IHS to eliminate a downward swiping gesture from the candidate gestures.

15. The IHS of claim 1, wherein the movement is detected as a rotation downward, and wherein the program instructions, upon execution by the processor, further cause the IHS to eliminate an upward swiping gesture from the candidate gestures.

16. The IHS of claim 1, wherein the movement is detected as a rotation downward, and wherein the program instructions, upon execution by the processor, further cause the IHS to eliminate a downward swiping gesture from the candidate gestures.

17. The IHS of claim 1, wherein the movement is detected as a translation, and wherein the program instructions, upon execution by the processor, further cause the IHS to eliminate a forward or backward swiping gesture from the candidate gestures.

18. A hardware memory of an Information Handling System (IHS), the hardware memory having program instructions stored thereon that, upon execution, cause the IHS to:
receive a first set of images from a Simultaneous Localization and Mapping (SLAM) camera, wherein the first set of images captures movement of a Head-Mounted Device (HMD);
calculate a transformation matrix based upon the first set of images;
receive a second set of images from a gesture camera, wherein the second set of images captures a gesture, and wherein the SLAM camera and the gesture camera are offset by a physical distance;
apply an offset matrix to the second set of images prior to recognizing the gesture, wherein the offset matrix corresponds to the physical distance; and
apply the transformation matrix to the second set of images prior to recognizing the gesture.

19. A method, comprising:
receiving a first set of images from a Simultaneous Localization and Mapping (SLAM) camera, wherein the first set of images captures movement of a Head-Mounted Device (HMD);
calculating a transformation matrix based upon the first set of images;
receiving a second set of images from a gesture camera, wherein the second set of images captures a gesture;
converting the second set of images from a gesturing coordinate system into a global coordinate system;
multiplying the one or more images of the second set of images by the transformation matrix to produce SLAM-compensated images, at least in part, by subtracting an HMD velocity from a gesture velocity;
converting the SLAM-compensated images from the global coordinate system into the gesturing coordinate system; and
applying the transformation matrix to the second set of images prior to recognizing the gesture.

* * * * *